United States Patent Office 3,424,013
Patented Jan. 28, 1969

3,424,013
TORCH CARRIAGE DRIVING ARRANGEMENT
Anton Josef Richard Bechtle, Niederhochstadt, and Georg Roder, Frankfurt am Main-Fechenheim, Germany, assignors to Messer Griesheim, G.m.b.H., Frankfurt am Main, Germany, a corporation of Germany
Filed Sept. 22, 1966, Ser. No. 581,268
Claims priority, application Germany, Sept. 24, 1965, M 66,759
U.S. Cl. 74—37    10 Claims
Int. Cl. F16h *19/06*

ABSTRACT OF THE DISCLOSURE

A torch carriage is selectively driven by a driving arrangement which includes a driven perforated band having a pair of reaches which extend through downwardly opening slits in the torch carriage. The carriage includes coupling means for selectively coupling the carriage with one of the reaches so that carriage can be moved in accordance with the band.

---

This invention relates to a driving arrangement for the rail guided torch carriages of a metal burning cutting machine, and more particularly to a driving arrangement wherein an endless band is driven and guided alongside the rail.

Driving arrangements for torch carriages are usually guided by hand or automatically according to a program or copying process so that the traversing torch carriages are guided along a predetermined path of travel. It is important that the torch carriages be guided back and forth along the rail precisely according to the amount of movement of the driving arrangement. Torch carriage travel can be accomplished by utilizing an endless chain, for example, which is driven by means of a toothed wheel or sprocket that grips the chain. Chains, however, are subject to lengthenings and distortions of the individual chain elements and can only be controlled with extreme difficulty. Moreover, if the chain has lengthened or stretched, the relationship between the chain and torch carriages is adversely effected. The result is that the driving motion of the chain is transmitted to the torch carriages in a jerking manner when a carriage is connected to the chain for movement therewith.

Accordingly, it is the object of the present invention to provide a simple and effective driving arrangement for motivating the torch carriages of a metal burning cutting machine.

Another object of the present invention is a driving arrangement that moves the torch carriages of a metal burning cutting machine smoothly in either direction along a transverse guide rail.

According to the present invention, a driving arrangement is provided comprising an endless steel band or strip having equally spaced apertures along its length. The endless band can be trained about a pair of spaced guide rollers so that power transmitted to one of the rollers causes the band to move. At least one of the rollers is provided with a plurality of peripheral projections that engage the apertures in the band to positively drive it. An endless band, provided in accordance with the present invention, has substantial advantages in the case of the present driving arrangement as compared to other types of endless drives. An endless steel band, in contrast to a chain, does not consist of individual elements. It is therefore not necessary to provide a series of joints which are easily distorted and stretched. Although an endless steel band can also stretch, such stretching distributes itself evenly over the entire steel band and can readily be compensated for by tensioning the band. On the other hand, distortion or stretching of the individual chain elements adversely effects the transfer of power to the torch carriages when the individual carriages are intermittently coupled to the chain for movement therewith. By means of the perforations or apertures in the band slippage of the band on the rollers is prevented since the projections on the roller engage the perforations to positively drive the band.

An endless steel band is stiff in on direction, namely in the direction of the surface extension. Accordingly, an endless steel band in contrast to other endless constructions, for example chains, cannot swing in this direction. Thus, the driving arrangement of the present invention prevents such swingings which might otherwise cause undesirable movement of the torch traversing carriages.

In the case of metal burning cutting machines, a plurality of traversing torch carriages are arranged next to each other on a single guide rail. It is often desirable to move a single carriage without moving the others and for this reason it is necessary to provide a coupling device on each torch carriage, which device functions to attach the carriage to an endless drive, as desired. In order to move a single carriage, the coupling device of that carriage is activated which in turn connects the carriage to the drive. The other carriages being uncoupled remain stationary. An endless steel band as the drive functions particularly well since the coupling device can be clamped to the band at any desired position, whereas in the case of a drive composed of individual elements, for example a chain, coupling of this type is not possible. In the latter case a coupling can only occur at particular predetermined locations on thre chain, and these locations are governed by the configuration of the individual chain elements.

A construction according to the present invention comprises a torch carriage which can be coupled to a steel band at any desired position on the band. The carriage has a slot-like opening into which one of the two reaches of the endless band can be inserted. When activated, the coupling device of the carriage may extend into the opening to clamp the carriage to the band.

One can drive the traversing torch carriages in both directions through a single reach of the steel band. For this purpose however it is necessary that the band be driven in the direction of desired carriage travel.

Alternatively, the torch carriages may be driven in either direction without reversing the direction of band travel. This is accomplished by utilizing both reaches of a continuously moving endless band and by coupling the carriage to the reach of the band that is moving in the direction of desired carriage travel. A slot-like opening for each reach of the band can be provided in the carriage structure and the coupling device can operate to connect the carriage to either reach.

In order to service the individual torch carriages, the slot-like openings can face downwardly to facilitate removal of the carriage from its associated guide rail. This construction enables the carriage to be removed without interfering with the endless band.

If the coupling takes places exclusively by clamping, which is advantageous because as already mentioned a coupling is possible at any desired position on the steel band, the clamping must be substantial in order to avoid slippage. For this reason a hydraulic coupling device is desirable because power can be conveniently multiplied.

In the case of a torch carriage capable of being coupled to both reaches of the steel band, one may construct the coupling device in such a manner so the carriage can be coupled to either reach of the band. Thus, the carriage can be coupled either to the forerunning reach or the return running reach or to neither reach. If the band always moves in the same direction then the torch carriage in the case of one coupling will run for example to the right, and in the case of the other coupling to the left, and when uncoupled it will remain stationary. One may also, if desired, simultaneously activate the coupling device for each reach of the band so that the carriage is coupled to both of the reaches. The result is that the steel band is no longer free to rotate.

Novel features and advantages of the present invention will become apparent to one skilled in the art from a reading of the following description in conjunction with the accompanying drawings wherein similar reference characters refer to similar parts and in which.

Figure 1:
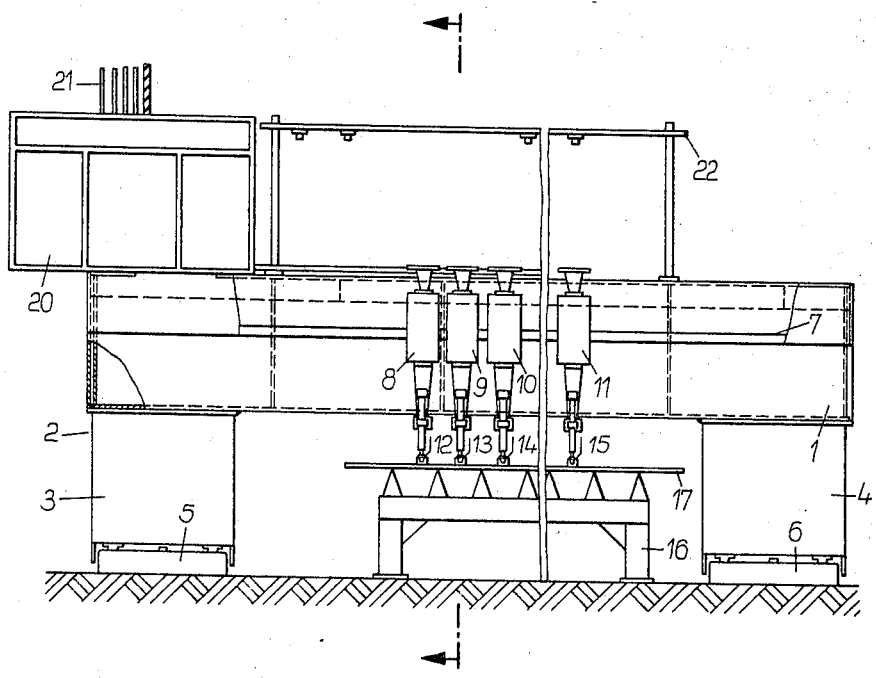
FIGURE 1 is a front elevational view of a metal burning cutting machine according to the present invention.

Referring in more particularity to the drawings, a metal burning cutting machine comprises a lower carriage assembly 2 including a transverse bridge 1 and a pair of support structures 3, 4 movably mounted on guide rails 5, 6. As shown in FIGURE 1 an upper guide rail 7 is attached to the carriage assembly 2 and four torch carriages 8, 9, 10, and 11 are movably mounted on the rail. A metal burning cutting torch is secured to each of the torch carriages and these cutting torches are represented by numerals 12–15. During operation of the machine the metal burning cutting torches are guided over a workpiece 17 positioned on the work table 16. As can be readily understood, movement of the transverse bridge 1 along the rails 5, 6 together with movement of the carriages on the upper rail 7, directs the cutting torches to any desired location on the workpiece.

A switchboard 20 may be provided for activating electrical and other control devices (not shown) of the cutting machine. Further, gas conduits 21 and support structure 22 may be fixed to the bridge 1 to facilitate operation of the torches.

The guide rail 7 for the torch carriages 8–11 is preferably protected against the effect of external dust by encasing the rail with fluid.

Figure 3:
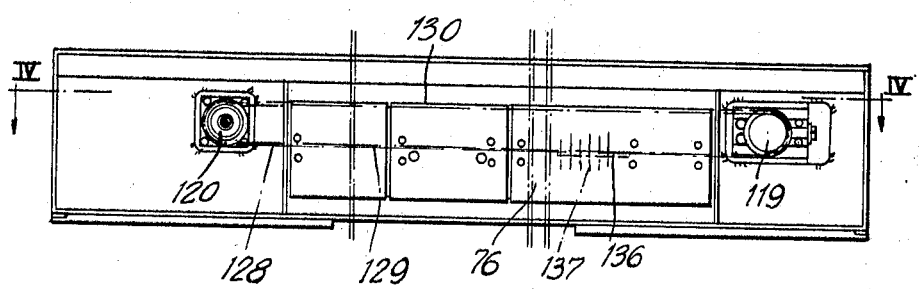
FIGURE 3 is a plan view of the driving arrangement for the torch carriages of the machine shown in FIGURE 1.
Figure 4:
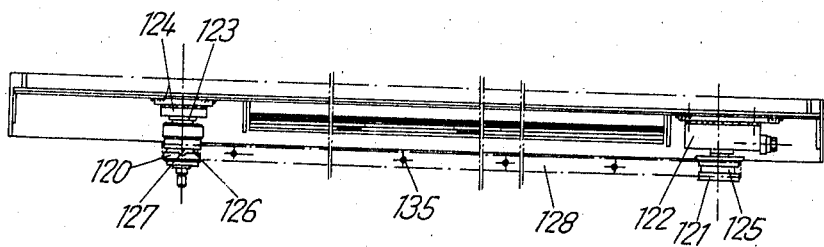
FIGURE 4 is a sectional view taken along line IV—IV of FIGURE 3.

As illustrated in FIGURE 3, roller guides 119, 120 are positioned one at each end of the head 76 of the rail 7. The roller guide 119 can be an idler and is accordingly loosely mounted on the bearing 122. The roller 120, as illustrated in FIGURE 4, is fixed to the drive shaft 123 of an electric driving motor 124. Both of the guide rollers 119 and 120 are provided with a peripheral groove 125 and 126, respectively. Three balls 127 are positioned in the peripheral groove of the driven roller 120 at 120° from each other and these balls extend slightly from the outer contour of the driven roller.

A steel band 128 is trained around the guide rollers 119, 120. The band has two reaches or stretches 129, 130 which run parallel to the upper guide rail 7. The steel band is provided with perforations or apertures 135 that form an uninterrupted series along the middle of the band. The distance between adjacent apertures 135 is approximately equal to the peripheral distance between adjacent balls 127 in the driven roller 120. Thus, the circumference of the roller 120 is three times as great as the distance between two adjacent apertures 135 in the band. The diameter of the apertures is dimensioned to permit the balls 127 of the roller 120 to enter the aperture. The steel band is positioned on the driven roller 120 in such a manner so that the balls 127 register with the apertures 135 in the band.

The ends of the steel band are joined together by a splice 136 to thereby form an endless band configuration. The splice 136 is provided with apertures that correspond to the apertures 135 in the band. The splice may be fixed to the band by rivets 137 arranged in the middle of the band so that they fit into the peripheral grooves 125, 126 in the guide rollers.

Figure 2:
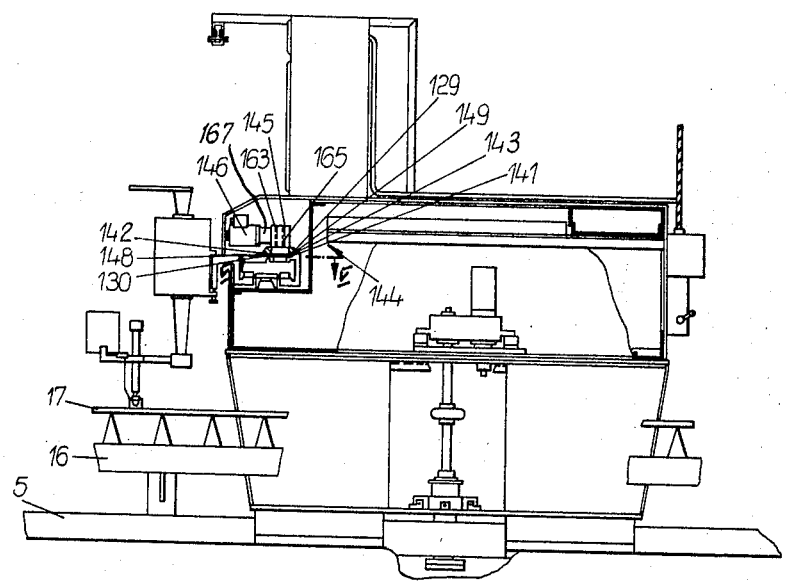
FIGURE 2 is a sectional view taken along line II—II of FIGURE 1.
Figure 6:
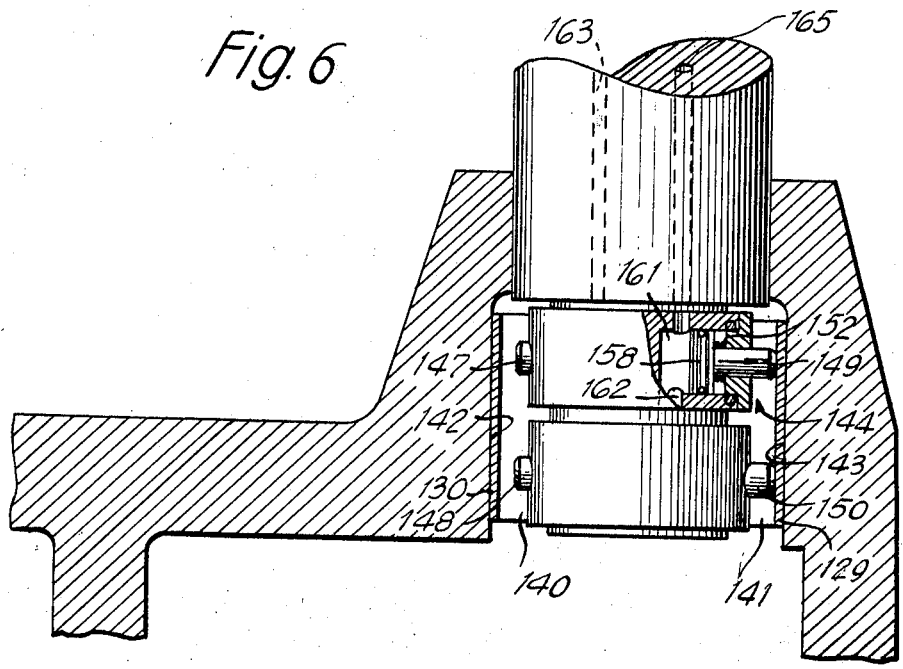
FIGURE 6 is an enlarged view of a portion of the apparatus shown in FIGURE 2 in a different phase of operation.

As shown in FIGURE 2 and FIGURE 6, each reach of the endless steel band 128 extends into a slot-like opening or slit 140, 141 in the torch carriage. Each of the slits 140, 141 opens downwardly and is bound on one side by a striking surface 142, 143 parallel to the plane of the band.

Figure 5:
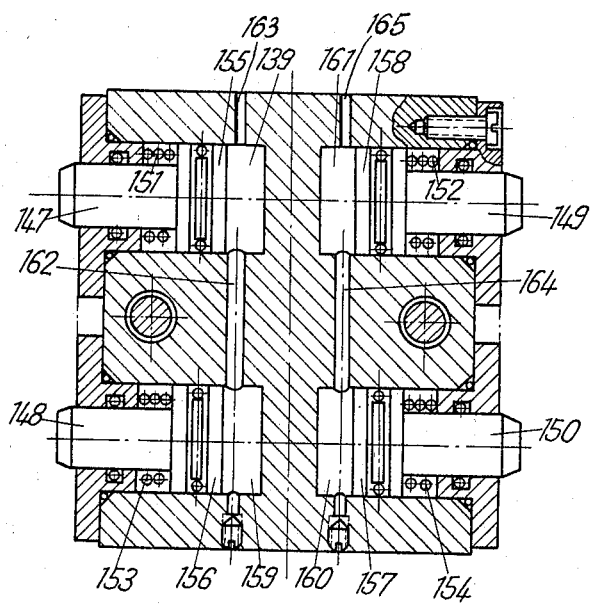
FIGURE 5 is a view taken along line V—V of FIGURE 2.

A coupling device 144 is attached to each torch carriage and consists of a hydraulic element 145, an electromagnet 146 for activating the hydraulic element, and four clamping bolts 147–150 arranged in pairs on opposite sides of the device. Each pair of bolts is directed to a different reach of the continuous steel band 128. The clamping bolt 147, as shown in FIGURE 5, and FIGURE 6, is arranged so it can slide lengthwise in a direction perpendicular to the striking surface 142. A coil spring 151 surrounds the bolt 147 and functions to urge it away from the striking surface 142. Additional springs 152, 153, 154 can likewise be provided for the other clamping bolts. The bolt 147 is attached to a hydraulic piston 155 that slides in a cylinder 139. The other bolts are also fixed to pistons 156, 157, 158 and these pistons slide in the cylinders 159, 160, and 161, respectively. The two cylinders 139 and 159 are connected in parallel by a line 162 which in turn is connected to a common power output 163. The second cylinder pair is also connected in a similar manner. A line 164 connects the cylinders 160, 161 and that line is connected to a power output 165.

A piston slidably mounted in a cylinder 167, together with the electromagnet 146, function to control the coupling device 144. The above described hydraulic system is initially filled with hydraulic fluid. In the illustrated position of the piston cylinder 167 arrangement, the cylinders 139, 159, 160, and 161 are free of fluid pressure and the springs 151–154 function to urge the bolts to their withdrawn ineffective positions. In this position the coupling device 144 is ineffective and a driving transfer from the steel band 128 to the torch carriage 8 cannot take place. Thus, the torch carriage 8 remains in a stationary position even if the steel band 128 is operating, for example, to move other torch carriages. In order to move the torch carriage 8 it must be coupled to one of the reaches 129, 130 of the steel band. The particular reach depends upon which direction the torch carriage is to be moved in relation to the circulating direction of the steel band 128. Assuming one desires to couple the torch carriage 8 to the reach 129, as shown in FIGURE 6, the operator causes an electrical impulse to activate the electromagnet 146 so that the magnet draws the piston in cylinder 167 to the right as viewed in FIGURE 2. With the piston positioned in the righthand portion of the cylinder 167 fluid pressure is produced in the hydraulic system and this pressurized fluid travels through the conduits 165, 164 into the cylinders 160, 161. The fluid exerts pressure on the pistons 157, 158. This pressure is greater than the force of the springs 152, 154 so that the clamping bolts 149, 150 are forced against the striking surface 143 to thereby securely clamp the carriage 8 to the reach 129 of the endless steel band 128. The carriage 8 follows the movement of the reach 129 as long as the electromagnet 146 remains activated as described above. Once the carriage arrives at its new position, activation of the electromagnet 146 is terminated and the piston again returns to the neutral position in cylinder 167 as illustrated in FIGURE 2. The pressure in the righthand portion of the hydraulic system again decreases and the clamping bolts 149, 150 return to their withdrawn positions under the influence of the coil springs 152, 154. The reach 129 of the band is thus free to move within the slit 141. The torch carriage 8 remains stationary in the position it assumes at the time of uncoupling, that is when the electromagnet 146 is deactivated.

The torch carriage can also be moved in corresponding manner continually back and forth according to a predetermined program. For this purpose it is sufficient to couple the carriage to a reach of the band during operation of the program and to run the driving motor 124 in accordance with the requirements of the program. The band then follows the movement of the driving motor and functions to move the carriage 8 in accordance with the program.

The torch carriages may be coupled to the other reach 130 of the endless steel band 128. For this purpose the piston is drawn to the other side of the cylinder 167 by the electromagnet 146.

The slits 140, 141 open from below so the torch carriage can be lifted off both of the reaches 129, 130 of the band. The introduction of another carriage can be accomplished in reverse fashion.

The above described operation also applies to the remaining torch carriages 9, 10, and 11. If the electromagnets of the other carriages corresponding to the electromagnet 146 are arranged parallel to each other, then all of the carriages will carry out the same movement parallel to each other. The electromagnets can also be activated through special circuits or lines so that the individual carriages may be moved separately from each other.

What is claimed is:

1. The combination of a torch carriage and a driving arrangement for the carriage, the driving arrangement including an endless perforated band and motivating means for positively driving the band, the motivating means including a driven roller having peripheral projections that engage the perforations in the band, the torch carriage having a first slit for one reach of the endless band, first coupling means on the torch carriage for connecting the carriage to the endless band at the first slit, the torch carriage having a second slit for another reach of the endless band, second coupling means on the torch carriage for connecting the carriage to the endless band at the second slit, and each of the slits in the torch carriage opening downwardly.

2. The combination of a torch carriage and a driving arrangement for the carriage, the driving arrangement including an endless perforated band and motivating means for positively driving the band, the motivating means including a driven roller having peripheral projections that engage the perforations in the band, the torch carriage having a first slit for one reach of the endless band, first coupling means on the torch carriage for connecting the carriage to the endless band at the first slit, the torch carriage having a second slit for another reach of the endless band, second coupling means on the torch carriage for connecting the carriage to the endless band at the second slit, and the coupling means comprising hydraulically operable clamping bolts for coupling the torch carriage to the endless band.

3. The combination of claim 2 wherein the clamping bolts are connected to couple the torch carriage to either reach of the endless band.

4. The combination of claim 2 wherein the torch carriage includes striking plates adjacent the slits, and the clamping bolts couple the carriage to the endless band by urging the band tightly against the striking plates.

5. The combination of claim 4 wherein the clamping bolts are arranged in pairs, one pair for each reach of the endless band, and biasing means for each clamping bolt connected to urge each bolt away from an extended coupling position.

6. The combination of a torch carriage and a driving arrangement for the carriage, the driving arrangement including an endles band and motivating means for positively driving the band, the torch carriage having a first slit for one reach of the endless band, first coupling means on the torch carriage for connecting the carriage to the endles band at the first slit, the torch carriage having a second slit for another reach of the endless band, second coupling means on the torch carriage for connecting the carriage to the endless band at the second slit, each of the slits opening downwardly, and each coupling means comprising clamping bolts for coupling the torch carriage to the endless band.

7. The combination of claim 6 wherein the clamping bolts are connected to couple the torch carriage to either reach of the endless band.

8. The combination of claim 6 wherein the clamping bolts are hydraulically operable.

9. The combination of claim 6 wherein the torch carriage includes striking plates adjacent the slits, and the clamping bolts couple the carriage to the endless band by urging the band tightly against the striking plates.

10. The combination of claim 9 wherein the clamping bolts are arranged in pairs, one pair for each reach of the encless band, and biasing means for each clamping bolt connected to urge each bolt away from an extended coupling position.

References Cited

UNITED STATES PATENTS

| 2,040,934 | 5/1936 | Gillen | 74—37 |
| 2,847,859 | 8/1958 | Lynott | 74—37 |
| 3,291,470 | 12/1966 | Lotz | 266—23 |
| 3,301,543 | 1/1967 | Semper | 266—23 |

FRED C. MATTERN, JR., *Primary Examiner.*

WESLEY S. RATLIFF, JR., *Assistant Examiner.*